United States Patent [19]

Shimaoka et al.

[11] Patent Number: 4,685,011

[45] Date of Patent: * Aug. 4, 1987

[54] RECORDING AND REPRODUCING APPARATUS INCLUDING A CASSETTE LOADING DEVICE

[75] Inventors: Motohiro Shimaoka; Yukio Saito, both of Furukawa, Japan

[73] Assignee: Alps Electric Co., Japan

[ * ] Notice: The portion of the term of this patent subsequent to Feb. 11, 2003 has been disclaimed.

[21] Appl. No.: 578,277

[22] Filed: Feb. 8, 1984

[30] Foreign Application Priority Data

Feb. 9, 1983 [JP] Japan .............................. 58-16680[U]

[51] Int. Cl.⁴ ............................................ G11B 5/012
[52] U.S. Cl. ..................................................... 360/97
[58] Field of Search ..................... 360/97, 98, 99, 96.1, 360/96.3, 96.4, 96.5, 96.6

[56] References Cited

U.S. PATENT DOCUMENTS

| 4,368,495 | 1/1983 | Hamanaka et al. | 360/97 |
| 4,539,613 | 9/1985 | Suyama et al. | 360/97 |
| 4,570,195 | 2/1986 | Shimaoka et al. | 360/97 |
| 4,570,196 | 2/1986 | Shimaoka et al. | 360/97 |

FOREIGN PATENT DOCUMENTS

| 58-108055 | 6/1983 | Japan | 360/97 |
| 59-30262 | 2/1984 | Japan | 360/97 |

*Primary Examiner*—Robert S. Tupper
*Assistant Examiner*—Melissa J. Koval
*Attorney, Agent, or Firm*—Guy W. Shoup

[57] ABSTRACT

A recording and reproducing apparatus using a disk cartridge has a frame provided with angular holes each of which consists of a horizontal portion and a vertical portion. Rollers are disposed on the sides of the cartridge holder, and these rollers are moved vertically in the angular holes when a disk cartridge is inserted into the apparatus. The apparatus includes cam members having flat portions, inclined portions and intermediate edge portions. The apparatus further includes resilient members in resilient contact with the cam members for biasing the edge portions from the sides of the centers of the rollers toward the horizontal portions when the rollers are located in the vertical portions of the angular holes to allow the cartridge holder to be operatively connected with the apparatus.

5 Claims, 4 Drawing Figures

RECORDING AND REPRODUCING APPARATUS INCLUDING A CASSETTE LOADING DEVICE

FIELD OF THE INVENTION

The present invention relates to a recording and reproducing apparatus using a disk cartridge.

BACKGROUND OF THE INVENTION

Recently, a recording and reproducing apparatus having a cartridge holder into which a disk cartridge made of a rigid material is inserted has been developed. The disk cartridge receives a magnetic disk rotatably therein. The apparatus includes cam members having angular holes, flat portions and inclined portions for pushing up the holder. The cartridge holder is operatively connected with and, disconnected from, the apparatus by the action of the cam members and rollers which are disposed on the sides of the holder. However, if errors occur in the positions or dimensions of the angular holes, the inclined portions and the rollers, the cartridge holder is not smoothly connected to the apparatus operatively.

SUMMARY OF THE INVENTION

It is the main object of the present invention to provide a recording and reproducing apparatus which is free from the foregoing difficulties with the prior art apparatus and which has a simple structure capable of accurately connecting its cartridge holder with the apparatus operatively.

The apparatus according to the invention is characterized in that it is comprised of a frame provided with angular holes each of which consists of a horizontal portion and a vertical portion; rollers disposed on the sides of the cartridge holder, the rollers being moved vertically in the angular holes by insertion of a disk cartridge to operatively connect the cartridge holder with the apparatus; cam members having flat portions, inclined portions and edge portions, the flat portions engaging with the rollers to guide same, the inclined portions coming into abutting engagement with the rollers to push up same for operatively disconnecting the cartridge holder from the apparatus, the edge portions forming transition portions from the flat portions to the inclined portions; and resilient members in resilient contact with the cam members for biasing the edge portions from the sides of the centers of the rollers toward the horizontal portions when the rollers are located in the vertical portions of the angular holes to allow operative connection of the cartridge holder with the apparatus.

Other objects and features of the invention will appear in the course of the description thereof which follows.

DETAILED DESCRIPTION OF THE INVENTION

Figure 1:
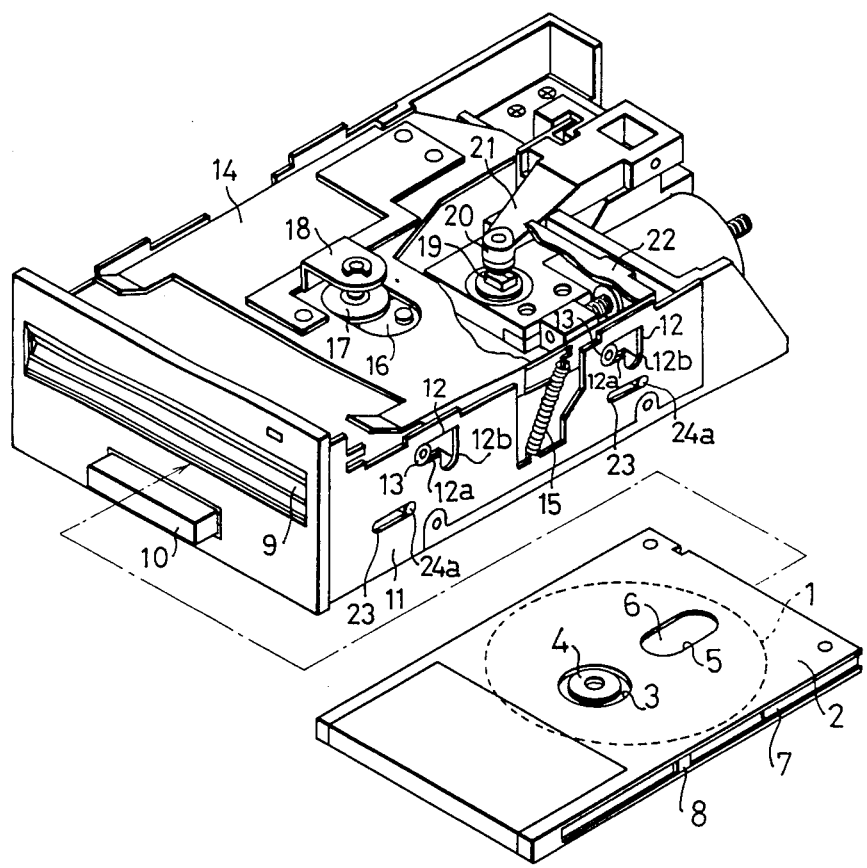
FIG. 1 is a schematic perspective view of an apparatus according to the present invention.

Referring to the drawings, there is shown an apparatus embodying the concept of the present invention as well as a disk cartridge 2 adapted to be inserted into the apparatus. A magnetic disk 1 is rotatably housed in the cartridge molded out of a rigid synthetic resin. A hole 3 extends through the central portion of the cartridge 2, and a hub 4 for holding the disk 1 in the center of the cartridge extends out through the hole 3. An opening 5 is formed in a given position of the cartridge to allow insertion of a magnetic head. Rotatably disposed below the opening 5 is a shutter 6 made of a metal plate. The cartridge is provided with grooves 7 on both sides thereof, and a shutter operation element 8 for operating the shutter 6 is disposed in one of the grooves 7 so as to be slidable therein.

Figure 2:
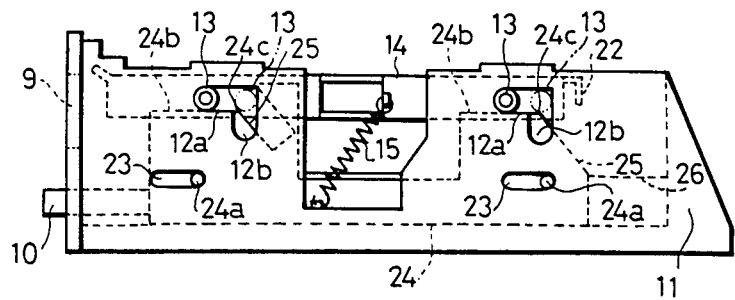
FIG. 2 is a side elevation of the main portion of the apparatus shown in FIG. 1 when its cartridge holder is not operatively connected with the apparatus.
Figure 3:
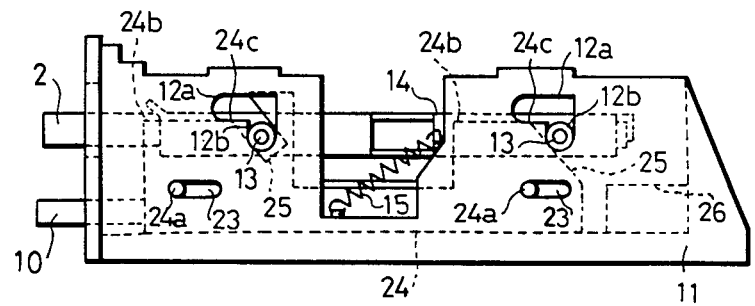
FIG. 3 is a side elevation of the main portion of the apparatus shown in FIG. 1 when its cartridge holder is operatively connected with the apparatus.
Figure 4:
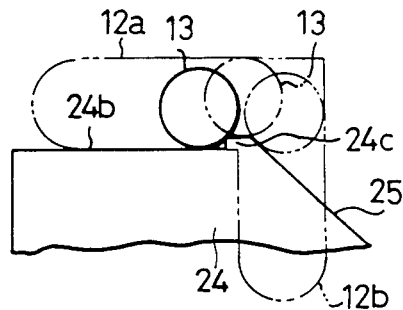
FIG. 4 is a fragmentary side elevation of the main portion shown in FIG. 1 when its cartridge holder is being shifted for operative connection with the apparatus.

The front frame of the recording and reproducing apparatus is provided with an opening 9 to allow insertion of the cartridge 2. The front frame also has an eject button 10. Disposed at the back of this opening 9 is a cartridge holder 14 having rollers 13 on its sides. Both sides of the frame 11 of the apparatus are provided with angular holes 12, by which the rollers 13 are guided. Tension springs 15 are disposed in the frame 11 to always bias the holder 14 toward the front frame and downwardly. When the cartridge 2 is not inserted, the springs 15 place the rollers 13 at the front ends of the horizontal portions 12a of the angular holes 12, as shown in FIG. 2. As can be seen from FIG. 1, the front upper portion of the holder 14 has the support portion 18 of a pressing portion 17 which presses the hub 4 of the disk 1 against the turntable 16 of the apparatus. The upper surface of the rear portion of the holder 14 has an abutment portion opposite to the magnetic head 19 and acting to push up an arm 21 having a pad 20 when the rollers 13 of the holder 14 are put in the horizontal portions 12a of the angular holes 12. The rear end portion of the holder 14 has a bent portions 22 which comes into contact with the front end of the cartridge 2.

Connected to the eject button 10 are cam members 24 to push up the holder. The cam members 24 have pins 24a on their sides, the pins being guided by the lateral holes 23 formed on the sides of the frame 11. Each cam members 24 has inclined portions 25, flat portions 24b and edge portions 24c which form transition portions from the flat portions 24b to the inclined portions 25. These inclined portions 25 are capable of abutting on the rollers 13 when these rollers are in the vertical portions 12b of the angular holes 12. The flat portions 24b come into contact with the rollers 13 and guide the rollers 13 together with the horizontal portions 12a of the holes 12. Each of the edge portions 24c is formed with a protrusions of such a height that the rollers 13 can ride over. When the rollers 13 are located in the horizontal portions 12a prior to movement into the vertical portions 12b of the holes 12, the edge portions 24c must be shifted toward the horizontal portions 12a from the sides of the centers of the rollers 13. To maintain this relation among these positions, a resilient member 26 consisting of sponge, a spring or the like is disposed between the right wall of the frame 11 and each cam members 24 and is in resilient contact with the associated cam member 24, whereby the condition shown in FIG. 2 is maintained.

Accordingly, when the cartridge 2 is inserted into the cartridge holder 14 and the front end of the cartridge 2 pushes the bent portion 22 of the cartridge holder 14, the holder is moved to the right as viewed in the drawings. Thus, the rollers 13 pass across the horizontal portions 12a of the angular holes 12 and the flat portions 24b of the cam members 24 and reach the protrusions of the edge portions 24c. At this time, the rollers experience a resistance once. However, by inserting the cartridge deeper, the rollers 13 ride over the protrusions and move toward the inclined portions 25. Simultaneously, the rollers 13 reach the vertical portions 12b of the holes 12. Since the centers of the rollers 13 lie at the right side of the inclined portions 25, the resilience of the tension springs 15 cause the rollers 13 to push the inclined portion 25 to the left. At the same time, the rollers 13 rapidly move into the lower portions of the vertical portions 12b with the result that the cartridge holder 14 is pushed down, whereby it is operatively connected with the apparatus. Then, the pressing portion 17 formed in the holder 14 presses the hub 4 of the disk 1 against the turntable 16, so that the disk 1 is allowed to turn. Meanwhile, the shutter 6 is opened by an actuating pin (not shown) mounted near the opening 9 and so the opening 5 through which the magnetic head is inserted is open. Hence, the lowering of the holder 14 pushes down the pad 20 attached to the tip of the arm 21. Then, the magnetic disk 1 is pressed on the magnetic head 19, whereby the apparatus can perform recording and reproduction.

In order to operatively disconnect the cartridge holder 14 from the apparatus, the eject button 10 is pressed inwardly. Then, the inclined portions 25 of the cam members 24 push up the rollers 13 located on the lower portions of the vertical portions 12b of the angular holes 12. Thus, the rollers 13 are lifted up above the protrusions 24c up to the horizontal portions 12a while the rollers 13 are held by the inclined portions 25 and the vertical portions 12b of the holes 12. At that position, the rollers 13 disengage from the inclined portions 25. Therefore, the tension springs 15 in the holder 14 cause the roller 13 to ride over the protrusions 12c in the holes 12 and to move into the front ends of the horizontal portions 12a. This movement of the rollers 13 shifts the holder 14 upward and toward the opening 9 through which the cartridge is inserted. The result is that the apparatus is restored to the state where the holder is not yet operatively connected to the apparatus. Then, if the pushing of the button 10 is stopped, the resilience of the resilient members 26 moves the cam members 24 to the positions shown in FIG. 2, because the cam members 24 compressed the resilient members 26 in the previous operation. More specifically, the edge portions 24c of the cam members 24 are moved to the positions which are displaced from the sides of the centers of the rollers 13 toward the horizontal portions 12a when the rollers 13 are located in the vertical portions 12b.

In the novel recording and reproducing apparatus constructed as hereinbefore described, the resilient members are in resilient contact with the cam members to limit their positions. In this way, the simple structure makes it possible to precisely connect the cartridge holder to the apparatus operatively.

While the described embodiment represents the preferred form of the present invention, it is to be understood that modifications will occur to those skilled in the art without departing from the spirit of the invention. The scope of the invention is therefore to be determined solely by the appended claims.

What is claimed is:

1. A recording and reproducing apparatus having a front panel with an opening for insertion of a disk cartridge to be loaded or unloaded to or from an operative position for recording and reproducing in the apparatus, comprising:

a frame in the apparatus provided with guide holes each of which consists of a rearwardly extending horizontal portion and a downwardly extending vertical portion;

a cartridge holder for receiving a disk cartridge therein, said cartridge holder having rollers disposed on side portions thereof in engagement with said holes and being movable with said rollers guided in said guide holes horizontally rearward along said horizontal portions and vertically downward to the operative position along said vertical portions of said guide holes when said disk cartridge is inserted in the apparatus;

movable cam members having horizontal portions, rearwardly and downwardly inclined portions and protrusions at the intersection of said horizontal portions and inclined portions, each said cam member being in abutting engagement with a respective roller of said cartridge holder such that said horizontal portion of the cam member is moved relative to the roller when the roller is moved horizontally in the guide hole, said protrusion portion provides a physical contact as the roller is moved over said protrusion portion, and said inclined portion is moved relative to the roller so as to move the cam member frontwardly when the roller is moved vertically downward in the guide hole to the operative position or to push the roller vertically upward from the operative position when an ejection member is actuated to move the cam member rearwardly; and resilient members in resilient contact with said cam members for biasing said protrusion portions of said cam members frontwardly toward said roller when said rollers are located in said horizontal portions of said guide holes.

2. A recording and reproducing apparatus as set forth in claim 1, wherein said resilient members consist of sponge.

3. A recording and reproducing apparatus as set forth in claim 1, wherein said resilient members consist of spring members.

4. A recording and reproducing apparatus as set forth in claim 1, wherein said resilient members are disposed such that said protrusion portions are displaced toward the horizontal portions when the rollers are located in the vertical portions of the holes.

5. A recording and reproducing apparatus as set forth in claim 1, further comprising biasing means wherein said cartridge holder is biased toward the front of the apparatus and downwardly.

* * * * *